UNITED STATES PATENT OFFICE.

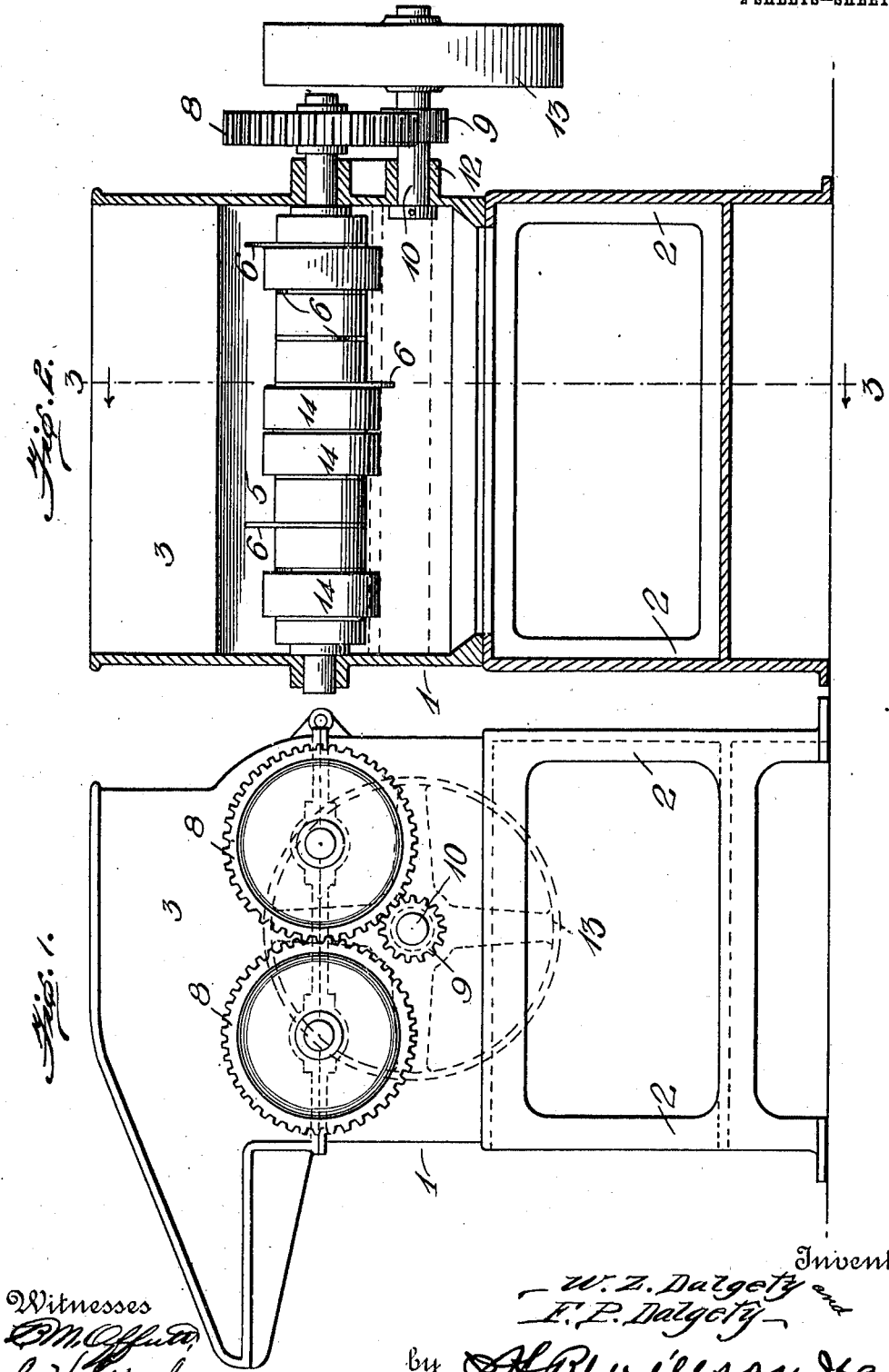

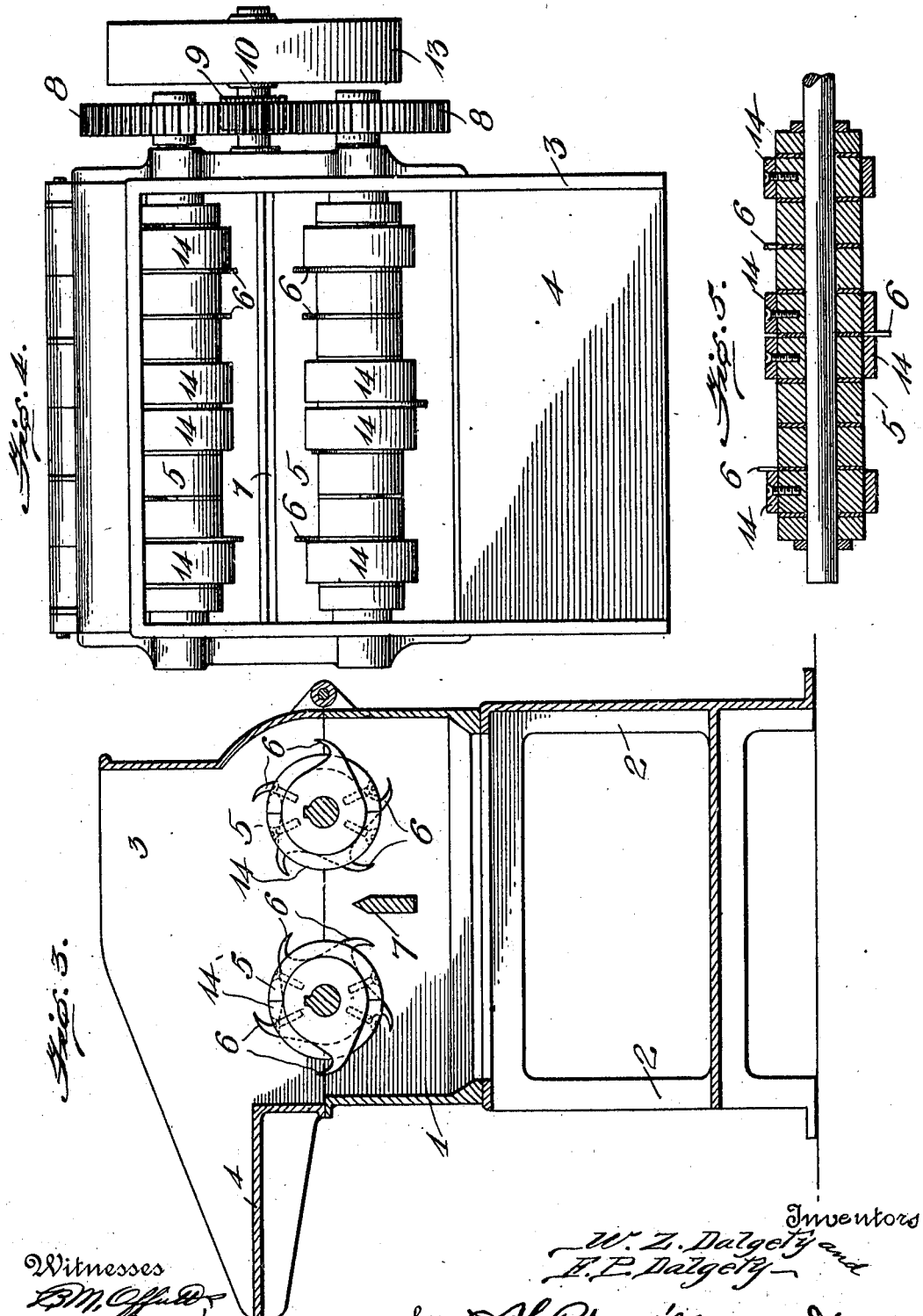

WILLIAM ZENO DALGETY AND FERDINAND PERCY DALGETY, OF ROCHESTER, NEW YORK.

ICE-CHIPPING MACHINE.

957,038.     Specification of Letters Patent.     Patented May 3, 1910.

Application filed March 5, 1909. Serial No. 481,528.

*To all whom it may concern:*

Be it known that we, WILLIAM ZENO DALGETY and FERDINAND PERCY DALGETY, citizens of the United States, residing at Rochester, in the county of Monroe and State of New York, have invented certain new and useful Improvements in Ice-Chipping Machines; and we do declare the following to be a full, clear, and exact description of the invention, such as will enable others skilled in the art to which it appertains to make and use the same.

This invention relates to improvements in ice chipping machines.

The object of the invention is to provide a machine of this character by means of which ice may be cut or chipped into pieces of suitable size for use in ice cream freezers or for other purposes.

A further object is to provide an ice chipping or cutting machine in which the size of the pieces of ice chipped or cut may be regulated.

With these and other objects in view, the invention consists of certain novel features of construction, combination and arrangement of parts as will be more fully described and particularly pointed out in the appended claim.

In the accompanying drawings, Figure 1 is an end view of the machine; Fig. 2 is a vertical, cross-sectional view; Fig. 3 is a vertical, longitudinal sectional view of the same on the line 3—3 of Fig. 2; Fig. 4 is a top plan view of the same; and Fig. 5 is a detail, longitudinal section of one of the drums and the cutting knives, showing the arrangement of the gages thereon.

In the embodiment of our invention, we provide a chipping box or frame, 1, which is supported upon standards or legs, 2, and on the upper side of which is hingedly mounted a hopper, 3, having on one side an ice shelf and chute, 4. Revolubly mounted in the chipping box, 1, are parallel ice chipping drums, 5, on each of which are arranged a series of chipping knives or blades, 6, said blades being preferably disposed spirally around the drums from one end to the other of the same, so that the cutting edges or points of the knives are out of longitudinal alinement. The arrangement of the knives is plainly shown in Fig. 2 of the drawings.

In the chipping box, 1, below and between the chipping drums, 5, is arranged a stationary blade, 7, which extends transversely through the chipping box from end to end and is provided to prevent the large pieces of ice which may be broken off by the chipping blades from falling through the machine.

The shafts of the chipping drums at one end of the chipping box project beyond the ice bearings and have rigidly mounted thereon intermeshing spur gears, 8. With one of the gears, 8, is engaged a drive pinion 9 which is fixedly mounted on a drive shaft, 10, said shaft being mounted in a suitable bearing, 12, on the end of the chipping box, as shown. On the outer end of the drive shaft, 10 is fixedly mounted a drive pulley, 13, with which is adapted to be engaged a driving belt, not shown. By means of the driving pulley, 13, the drive pinion, 9, will be operated and through said pinion one of the gears, 8, will be driven and the movement of said gear will be imparted to the adjoining intermeshing gear, thereby revolving the chipping drums inwardly or toward each other to cause the chipping knives thereon to chip or break the ice.

In order to regulate the sizes of the chips or pieces of ice cut off by the knives, we provide a series of gage rings, 14, said rings being preferably formed in two sections and secured to the drums at suitable intervals between the chipping knives thereon as clearly shown in Fig. 5 of the drawing. The gage rings may be secured to the drum in any suitable manner but are preferably screwed or bolted thereto as shown.

In the operation of the device, the cake of ice to be chipped is placed on the shelf or chute, 4, of the hopper 3, after which the latter is tipped upwardly and rearwardly thereby sliding the ice onto the chipping drums or knives, 8, into position to be engaged by the knives when the drums are revolved. By reason of the spiral arrangement of the chipping knives on the drums, the end knives on one end of the drums first engage the ice and chip the same after which the rest of the knives on the drums are consecutively brought into engagement with the ice until the same has been chipped across its entire surface at which time the cake of ice drops to a lower position and is again chipped across by the knives of the revolving drums. By providing the stationary blade, 7, any large chunk of ice which may be broken off will be caught and held thereby until the knives opposite the chunk of ice are brought around into engagement therewith at which time said chunk will be broken up to the proper size. By means of the gage rings, the chipping knives are prevented from cutting into the ice to a greater depth than the distance between the cutting edge of the knife and the gage and by providing a series of gage rings of different width or thicknesses, the size of the pieces or chips of ice cut off by the blades may be regulated. By means of the machine constructed as herein shown and described, large cakes or chunks of ice may be quickly reduced to the desired size for use in ice cream freezers or other purposes in which large quantities of cracked or chipped ice are employed.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described our invention, what we claim is:—

An ice chipping machine of the character described, comprising a supporting frame, a chipping box on said frame, parallel shafts revolubly mounted in said box, a series of gears connected to said shafts, a driving pulley to operate said gears, a plurality of cylinders arranged on said shafts, knives secured between the cylinders and projecting outwardly from their peripheries, a plurality of gage rings removably mounted on certain of said cylinders to coact therewith to form multi-diametered supports for the ice, said rings arranged to limit the cutting depth of certain of said knives, and a stationary blade arranged intermediate the shafts parallel with and below the same.

In testimony whereof we have hereunto set our hands in presence of two subscribing witnesses.

WILLIAM ZENO DALGETY.
    FERDINAND PERCY DALGETY.

Witnesses:
 C. H. JAMESON,
 JAMES COE MENZ.